US010154419B2

(12) United States Patent
Ekiz et al.

(10) Patent No.: US 10,154,419 B2
(45) Date of Patent: Dec. 11, 2018

(54) CONTROL OF DATA CONNECTIONS AND/OR DATA TRANSMISSIONS IN A MOBILE RADIO DEVICE (71) Applicant: Bayerische Motoren Werke Aktiengesellschaft, Munich (DE)

(72) Inventors: Levent-Yusuf Ekiz, Munich (DE); Christian Lottermann, Munich (DE); Oliver Klemp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 14/790,497

(22) Filed: Jul. 2, 2015

(65) Prior Publication Data
US 2016/0007214 A1    Jan. 7, 2016

(30) Foreign Application Priority Data
Jul. 4, 2014    (DE) .................. 10 2014 212 989

(51) Int. Cl.
*H04W 4/00* (2018.01)
*H04W 24/02* (2009.01)
*H04W 72/04* (2009.01)
*H04W 88/02* (2009.01)

(52) U.S. Cl.
CPC .......... *H04W 24/02* (2013.01); *H04W 72/04* (2013.01); *H04W 88/02* (2013.01)

(58) Field of Classification Search
CPC ...... H04W 24/02; H04W 72/04; H04W 88/02
See application file for complete search history.

(56) References Cited

U.S. PATENT DOCUMENTS

| 5,434,950 | A  | * | 7/1995 | Kaallman | ............. | H04W 36/32 |
| | | | | | | 706/20 |
| 8,160,613 | B2 | * | 4/2012 | Handforth | ............. | H04W 36/32 |
| | | | | | | 455/436 |
| 9,763,252 | B2 | * | 9/2017 | Kilpatrick, II | .... | H04W 72/0473 |
| 2009/0203379 | A1 | * | 8/2009 | Karaoguz | ............. | H04W 36/32 |
| | | | | | | 455/436 |
| 2010/0238905 | A1 | * | 9/2010 | Hamabe | ............. | H04W 52/242 |
| | | | | | | 370/335 |

(Continued)

FOREIGN PATENT DOCUMENTS

CN             103283271 A         9/2013
DE    10 2013 215 728 A1         10/2014

(Continued)

OTHER PUBLICATIONS

Hai-Bo Guo (an adaptive history-based and topology independent resource reservation scheme for future wireless mobile multimedia networks, 2005). (Year: 2005).*

*Primary Examiner* — Maharishi V Khirodhar
(74) *Attorney, Agent, or Firm* — Crowell & Moring LLP (57) ABSTRACT A method and a device are disclosed for controlling at least one data connection and/or one data transmission through the at least one data connection for a mobile radio device. Control information that was previously collected by one or more agents coupled to the mobile radio device is taken into account in the control of the data connection and/or the data transmission. The control information contains route- and/or user-specific information. The collecting of data is carried out by an agent, which is preferably designed to be self-learning.

20 Claims, 3 Drawing Sheets (56) References Cited

U.S. PATENT DOCUMENTS

| | | | |
|---|---|---|---|
| 2012/0165024 A1 | 6/2012 | Sugahara et al. | |
| 2014/0074995 A1* | 3/2014 | Beattie, Jr. | H04W 4/029 709/220 |
| 2014/0274064 A1* | 9/2014 | Al-Shalash | H04W 24/08 455/437 |
| 2015/0038180 A1* | 2/2015 | Quick, Jr. | H04W 64/00 455/458 |
| 2015/0045030 A1* | 2/2015 | Sonnevi | H04W 36/22 455/436 |

FOREIGN PATENT DOCUMENTS

| | | |
|---|---|---|
| DE | 10 2013 215 729 A1 | 10/2014 |
| DE | 10 2013 215 730 A1 | 2/2015 |

* cited by examiner

CONTROL OF DATA CONNECTIONS AND/OR DATA TRANSMISSIONS IN A MOBILE RADIO DEVICE

CROSS REFERENCE TO RELATED APPLICATION

This application claims priority under 35 U.S.C. § 119 from German Patent Application No. 10 2014 212 989.3, filed Jul. 4, 2014, the entire disclosure of which is herein expressly incorporated by reference.

BACKGROUND AND SUMMARY OF THE INVENTION

The invention relates to a method and a device for controlling data connections and/or data transmissions in a mobile radio device.

DE102013215728.2, which was not published before the present application, describes a method and a device for selecting a radio transmission channel in a radio system. In order to select a radio transmission channel from a group of radio transmission channels, data are used that relate to at least one previous radio connection, i.e., so-called historical data, for at least one of the radio transmission channels in a local region.

DE102013215729.0, which has not been published yet, discloses a system and a device for selecting a radio transmission channel in a radio system. A radio transmission channel is selected from a group of radio transmission channels by use of control data that are generated and/or stored outside of a mobile unit, wherein the data are transmitted, in particular, from an external data source to the mobile unit. The control data can comprise data regarding at least one previous radio connection, i.e., so-called historical data.

DE102013215730.4, which has not been published yet, describes a method for the optimized selection of a wireless communication channel in hybrid vehicle-based communication systems, wherein a requirement profile for a communication is predefined by a user and/or a vehicle manufacturer. The requirement profile contains entries, by which a suitability of a communication channel relative to another communication channel can be evaluated, wherein the entries can correspond to respective predefined properties of potential radio channels. A previously stored history can be accessed for this purpose.

CN103283271 discloses a system for estimating handover properties, which system comprises a device for determining movement routes that extend through a handover region or an adjacent region, wherein the movement routes are determined by use of map information regarding the handover region and the adjacent region. The handover region is a region in which a handover operation occurs between cells in a mobile communications system. The system further comprises a device for calculating handover properties of the movement routes by use of radio information regarding the environment of the movement routes.

The above-described devices and method for selecting a radio channel have proven effective in practical applications.

The problem addressed by the invention is that of enabling control of data connections and/or data transmissions in a mobile radio device, with which data connections between mobile radio devices and a transceiver can be used efficiently, the quality of service can be increased, and/or the data transmission costs or transmission costs can be reduced, in a manner that is simple and, in particular, cost-effective even with dynamically changing radio connections.

Another problem addressed by the present invention can be considered that of creating a mobile radio device that easily and cost-effectively enables efficient use of a data connection with a high quality of service and low transmission costs.

At least one of these problems is solved by the embodiments according to the invention.

In a method according to the invention for controlling at least one data connection and/or one data transmission via this at least one data connection in a mobile radio device, route- and/or user-specific information is acquired by way of one or more agents that are coupled to the at least one mobile radio device. In addition, the route- and/or user-specific information is used to control at least one data connection and/or one data transmission with respect to time and/or with respect to transmission parameters via this at least one data connection.

The agents can be used to acquire route- and/or user-specific information regarding the mobile radio device to which the agent is coupled. These are then historical data, which are used to control at least one data connection and/or one data transmission. It is also possible to acquire route- and/or user-specific information regarding other mobile radio devices. These data can be current or can also be historical data acquired over a relatively long period of time. This route- and/or user-specific information can also be used to control at least one data connection and/or one data transmission.

By acquiring route- and/or user-specific information and taking this into account, it is possible to efficiently use data connections between mobile radio devices and a transceiver and/or increase the quality of service and/or reduce the data transmission costs or transmission costs when controlling at least one data connection and/or one data transmission in a manner that is simple and, in particular, cost-effective even with dynamically changing radio connections. This is because the accounting for the route- and/or user-specific information is a substantial decision-making aid for automatically controlling a data connection and/or data transmission.

The route- and/or user-specific information can be acquired by way of a data collecting module that stores the route- and/or user-specific information as control information in an internal memory. The agent can also be designed as a self-learning system, in which the route- and/or user-specific information is acquired by learning during operation.

A data connection is a physical and/or logical connection between an application of the mobile radio device and an external communication partner for transmitting data, wherein such a data connection can use one or more radio channels.

The term "data transmission" describes the operation of transmitting data via a data connection. Examples thereof are downloading data (video files, audio files, applications, etc.) over or from the Internet, transmitting data for the purpose of carrying out a telephone conversation, playing a video and playing back audio data (music, etc.) via the mobile radio device in a streaming method, etc.

A radio system or a radio communication system comprises a transceiver and a mobile radio device, which communicate with one another via at least one radio channel.

A radio channel is a radio connection of one or more mobile radio devices via a certain frequency of a radio system to a transceiver located outside of the mobile radio devices. The connection capacity of the radio channel can be divided between a plurality of mobile radio devices in a time-division multiplexing method. The division of the connection capacities can also take place by assigning certain radio channels to certain data connections in the frequency-division multiplexing method. It is also possible to divide the connection capacities in a combination time- and frequency-dividing multiplexing method.

The connection capacity of a radio channel substantially corresponds to the data rate. The connection capacity can be defined more precisely by a combination of the data rate with the error rate by subtracting the error rate from the data rate. In addition, other parameters, such as latency, for example, can be incorporated into the determination of the connection capacity.

The control information comprises those parameters, on the basis of which a data connection and/or a data transmission can be controlled, such as transmission parameters, time information, location information, movement-specific information, user information, environment information, etc. These can be current and/or historical parameters that were stored in the past and/or have been repeatedly called up. There are relationships between individual parameters and groups of parameters.

The transmission parameters comprise connection parameters and data parameters.

The connection parameters are parameters that describe physical and logical properties of a data connection, such as the radio channel or radio channel ID, frequency, data rate, latency, error rate, capacity utilization, radio cell, time slot, availability, quality-of-service parameters, costs of the radio systems or channels, etc.

The data parameters are parameters that describe a data transmission via a data connection or that describe the properties of the data, such as data quantity, storage location, link or reference to the data, type of data, resolution of image or video data, the codec that is used, minimum data rate required for transmission, quality-of-experience parameters, costs of the data transmission or the data, etc.

Time information includes time of day, date, day of the week, type of weekday (work day, weekend, holiday), etc.

Location information includes location coordinates, maps, geodata, locations, topographical information, route information, weather data, etc.

Movement-specific information are parameters that describe the speed of movement, direction of movement, traffic density, etc.

User information is age, gender, behavior information, wherein behavior information describes the behavior of the user with respect to a data connection, a data transmission, or data.

Environment information is information that describes when and where small or relatively large groups of people are located at certain locations and/or how these groups collectively move, such as, for example, public events (sporting events, concerts, etc.), route schedules of transportation means, etc.

Route- and user-specific information includes all control information that is suitable for describing a driving route or the user behavior. This is, in particular, location coordinates of a driving route, geodata regarding the driving route, time information regarding the driving route or the user behavior, descriptions of user interactions, etc. In addition, this is all the control information, such as, for example, transmission parameters or connection parameters, which are linked to a description of the driving route. A driving route can be characterized, in particular, by a location, a destination and/or by at least one route location located between a starting location and a destination, or by the respective location coordinates thereof. The driving route can be traveled, in particular, by a user with a vehicle. In so doing, the user can also switch between a plurality of vehicles on the driving route, e.g., between a motor vehicle used individually by the user and a means of public transportation (bus, train, ferry, etc.) and/or vice versa, and or the user can travel segments of the driving route by foot, for example.

The control information can be provided by a mobile radio device or by a plurality of mobile radio devices. The control information is preferably statistically analyzed, wherein the values are weighted, in particular, according to their frequency.

An agent is a software unit that can autonomously acquire data. An agent comprises a module that statistically analyzes the data. Such a module that statistically analyzes the data can be a module that analyzes control information when stored or read out of the internal memory and, in particular, weights the control information according to its frequency. Such a module can also be a self-learning system, such as, for example, a neural network or a support vector machine (SVM), which acquires the data by internally weighting control information. The agent is designed to show a specified, independent, and inherently dynamic (autonomous) behavior.

The route- and/or user-specific information is collected during the operation of the mobile radio device and is stored as control information in an internal memory, wherein the control information is preferably stored so as to be linked to location and/or time information.

The control of a data transmission or data connection with respect to time makes it possible to access the data or a data transmission temporally in advance (prefetching) or with a time delay (delayed fetching). As a result, the connection capacities of a radio system can be used efficiently by transmitting data in advance when a fast radio connection is present. However, if a radio connection that is faster than the current radio connection will become available in the near future (e.g., due to an expected change in position of the mobile radio device), the data transmission can be delayed. This can take place with consideration for the point in time at which the data must be present for the user or at the mobile radio device.

A time-controlled data transmission can also minimize the transmission costs by transmitting large quantities of data over a cost-effective radio channel or a cost-effective radio system when there is an existing connection. Such a data transmission can take place in advance and as a delayed data transmission.

The control of a data connection with respect to transmission parameters includes the control of a radio channel. The control of a radio channel includes handover operations. A handover refers to a change in the frequency, a change in the time slot, a change in the radio cell, or a change in the radio system. The handover operations can be divided into various categories. A change within a radio cell of a radio system to another frequency or another time slot is referred to as an intracellular handover, a change within a radio system from one radio cell to an adjacent radio cell is referred to as a horizontal handover, and a change between radio systems that may have a different mobile radio technology is referred to as a vertical handover. By controlling handover operations, it is possible to efficiently divide the available radio capacities between the individual mobile radio devices, ensure a radio connection of a single mobile radio device when there is a radio system present at the position of the mobile radio device and when the mobile radio device moves, and select a more cost-effective and/or faster radio channel.

By controlling transmission parameters in a data transmission, it is possible to efficiently use available connection capacities of radio channels or a radio system by reducing the data rate or bandwidth that is used by an application when there is a connection to a radio channel or a radio system having a smaller transmission capacity. Likewise, when the available connection capacity is more than sufficient, the quality of service can be increased by increasing the data rate used by an application. The data rate can be increased or reduced, e.g., by adjusting the resolution and/or the codec of an application accordingly.

The agent is preferably installed as an internal agent in a mobile radio device, in particular on a mobile radio device arranged in a motor vehicle. The internal agent extracts information from existing radio connections, in particular radio-system specific information or connection parameters, and/or movement-specific or driving-behavior specific from other devices coupled to the mobile radio device, in particular location information, and/or time information, such as, for example, from a navigation system, tachometer, thermometer, rain sensor, calendar, or a clock. The agent stores this extracted information as control information.

Radio-system specific information or connection parameters are parameters that describe the radio channel, such as, for example, the radio channel ID, frequency, data rate, latency, error rate, capacity utilization, radio cell, time slot, availability, quality-of-service parameters, costs of the radio systems or channels, etc.

Route-specific information refers to parameters that describe a route and its environment, such as, for example, location coordinates, maps, geodata, topographical information, speed, direction, traffic density, ambient temperature, precipitation, and date values or times linked to the route, etc.

In addition, control information that describes the behavior of the user of the mobile radio device can be stored in the mobile radio device as user-specific control information.

User-specific control information that repeats often over a relatively long period of time is preferably weighted according to the frequency thereof by use of a statistical analysis. The information is accounted for in the control of the data connections and/or data transmissions by means of these weightings.

The acquired control information can be made anonymous and available for transmission to other mobile radio devices. This is an independent inventive concept, which can be implemented independently of the method for controlling data connections and/or data transmissions.

In this case, the transmission can take place via the transceiver, or also via a communication from the mobile radio device of a user to the mobile radio device of another user, such as, for example, a car2car communication.

In another embodiment of the present invention, the agent is provided on a transceiver and/or on a radio system control server, wherein the agent extracts information from existing radio connections, in particular radio-system specific information, and wherein the radio system control server controls the at least one data connection and/or the data transmission via the at least one data connection of the radio system.

By providing the agent as an external agent on a transceiver and/or on a radio system control server, which is connected to the transceiver, the agent can extract information from existing, in particular all, radio connections that are present at the transceiver, i.e., also radio connections from a plurality of mobile radio devices. The acquisition, storage, and (statistical) analysis can be carried out by the external agent in the same manner as by the above-described internal agent. The external agent has a substantially larger database, however.

The extracted information can also be analyzed and, possibly, anonymized, and can be transmitted as control information to a plurality of mobile radio devices.

A central communication unit of a motor vehicle, comprising at least one connecting module for establishing at least one wireless data connection between the central communication unit and at least one transceiver located outside the central communication unit is characterized by a communication organizing module. The communication organizing module is designed such that the communication organizing module controls the at least one data connection and/or the data transmission via the at least one data connection between the central communication unit and the at least one transceiver as per any one of the above-described methods according to the invention.

A radio system according to the invention comprises at least one transceiver and at least one mobile radio device according to the invention, wherein the at least one transceiver and the at least one mobile radio device communicate with one another via at least one data connection over at least one radio channel.

A motor vehicle according to the invention is characterized in that the motor vehicle comprises a mobile radio device according to the invention and can be connected to a transceiver of the above-described radio system via at least one wireless data connection.

Other objects, advantages and novel features of the present invention will become apparent from the following detailed description of one or more preferred embodiments when considered in conjunction with the accompanying drawings.

DETAILED DESCRIPTION OF THE DRAWINGS

In a first embodiment of a device according to the invention (FIG. 1), a mobile radio device 1 has a central communication unit 2 (ZKE). The central communication unit 2 comprises a plurality of connecting modules 3 (VM). Every connecting module 3 is connected to an antenna 4, by which radio signals can be transmitted and received.

Figure 1:
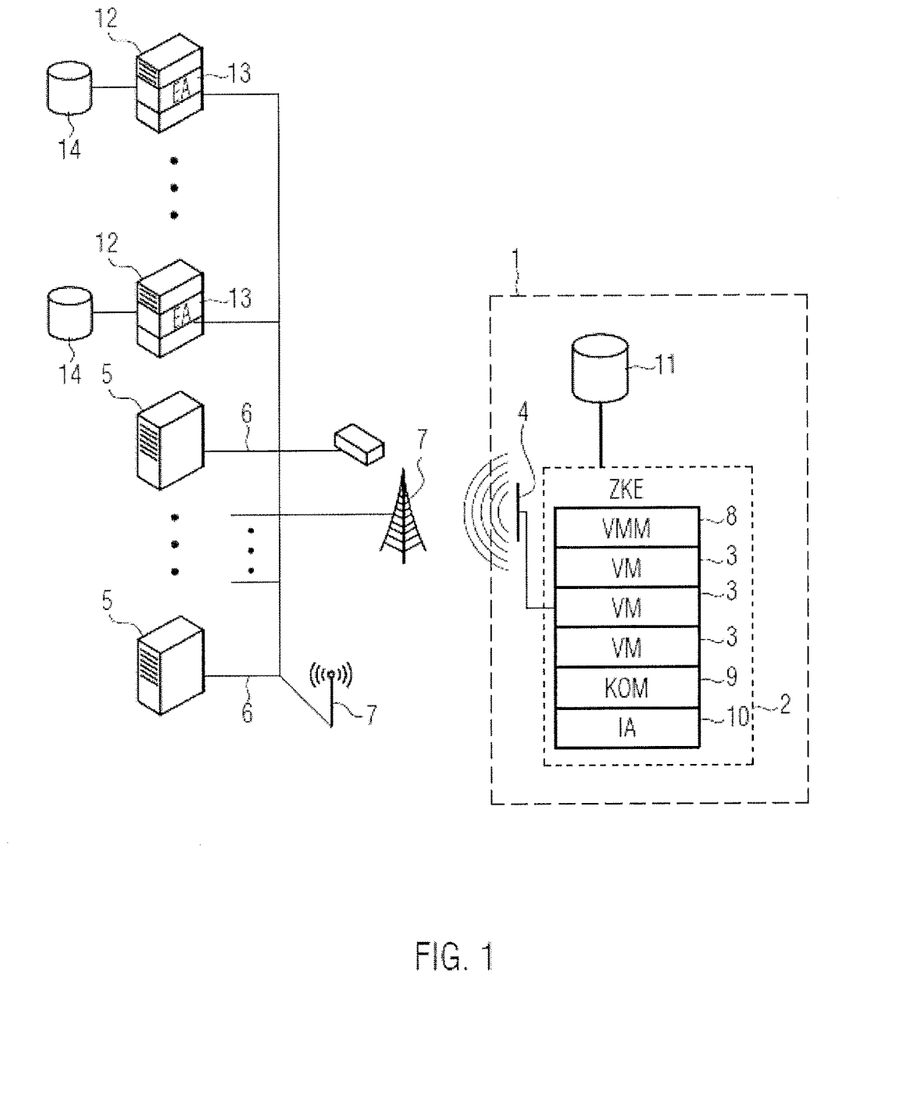
FIG. 1 schematically shows a mobile radio device for controlling data connections and/or data transmissions via at least one data connection in a radio system.

The mobile radio device 1 is preferably a component of a motor vehicle.

Each connection module 3 can establish and maintain a radio channel to external communication partners 5 according to one or more predetermined standards. The external communication partners 5 are usually servers that are connected to transceivers 7 via a data network 6, in particular the Internet. The external communication partners 5 can also be natural persons, who are connected to corresponding transceivers 7 by way of telephone devices via telephone lines (data network 6).

The connecting modules 3 are designed, e.g., to communicate by way of the following standards or radio systems: GSM, GPRS, EDGE, 3G/UMTS, HSPA, 4G/LTE, ETSI ITS-G5, and/or WLAN (IEEE802.11a, IEEE802.11b, IEEE802.11ac, IEEE802.11ad, IEEE802.11g, IEEE802.11h, IEEE802.11n, IEEE 802.11p). At least one radio channel can be operated using each connecting module 3 such that, by providing a plurality of connecting modules 3, a plurality of radio channels can be operated simultaneously, wherein the radio channels can also correspond to different standards. By means of the connecting modules 3, it is also possible to implement special data transmission modes, such as MIMO (Multiple Input Multiple Output). The individual connecting modules 3 are controlled by a connecting module manager 8 (VMM).

All of these radio standards are used for far-field communication. The connecting modules 3 are not normally designed for a far-field radio standard, such as Bluetooth, for example.

The connecting module manager 8 controls the radio channels between the central communications unit 2 and the external transceivers 7. This control takes place according to the requirements of an agent 10, 13, which is described below in greater detail.

The central communication unit 2 includes a communication organizing module 9 (KOM), which carries out data transmissions over existing, in particular logistic data connections, and stores the transmitted data in a data memory (not shown) for immediate or subsequent use by applications of the mobile radio device 1.

An agent 10 can be a component of the central communication unit 2. The agent is an internal agent 10 (IA), which is designed as a self-learning agent. The agent can comprise a neural network or a support vector machine. The agent is connected to the connection module manager 8 and to the communication organizing module 9 in order to control data connections and/or data transmissions.

The mobile radio device 1 includes an internal memory 11, which is connected to the central communication unit 2 and into which the internal agent 10 can write data and from which the internal agent 10 can read data.

The control information comprises parameters, on the basis of which a data connection and/or a data transmission can be controlled, such as transmission parameters, time information, location information, and user information. These can be current and/or historical parameters that were stored in the past and/or have been repeatedly called up. There are relationships between individual parameters and groups of parameters.

The internal agent 10 controls the data connections and/or the data transmissions of the mobile radio device 1 on the basis of the control information. The data connections are controlled by controlling the connecting module manager 8 and the data transmissions are controlled by controlling the communication organizing module 9.

The internal agent 10 can actively intervene into the control operations of the connecting module manager 8 by instructing it to transmit the prompt, to a connecting module 3, to change a radio channel and/or a time slot in an existing radio channel, or to establish or terminate a radio connection.

In a corresponding manner, the internal agent 10 can actively intervene into the control operations of the communication organizing module 9 by instructing it to redistribute an existing data connection over one or more radio channels, to establish or terminate such a data connection, and/or to transmit data via an existing data connection and store said data for subsequent use by an application.

By means of the active interventions by the internal agent 10 into the control operations of the connecting module manager 8 and/or the communication organizing module 9 of the mobile radio device 1, it is possible to control data connections and/or data transmissions between the mobile radio device 1 and one or more transceivers 7 with respect to time and/or with respect to transmission parameters.

In a second embodiment of a device according to the invention (FIG. 1), the components (units, equipment, devices) mentioned above in the description of the first embodiment are present, wherein the internal agent 10 and the internal memory 11 can also be left out. The same components will not be explained again.

One or more radio system control servers 12 are connected to the transceiver 7 via the data network 6. Therefore, the central communication unit 2 is connected to the radio system control server(s) 12 via the respective radio system or via at least one radio channel of the respective radio system.

The central communication units 2 of the various mobile radio devices 1 log on to the radio system control server 12 of the respective radio system and the associated radio system control server 12 cyclically checks to determine whether the individual mobile radio device 1 is still within radio range. Therefore, the associated radio system control server 12 is informed about the mobile radio devices 1 that are located within the radio range thereof, and about the radio channel assignment thereof.

The radio system control server 12 can include an external agent 13 (EA), which is substantially designed exactly like the internal agent 10 described above.

The radio system control server 12 is connected to an external device 14, into which the external agent 13 can write data and from which the external agent 13 can read data.

As is the case with the internal agent 10, the external agent 13 controls the data connections and/or data transmissions of one or more mobile radio devices 1 on the basis of the control information. The control is carried out via the existing radio connection to the respective mobile radio device 1. Since the external agent 13 can be connected to a plurality of mobile radio devices 1, the external agent can detect the communication thereof and thereby collect current connection data, in particular, and make this available to the different mobile radio devices 1.

The external agent 13 merely needs to be taught in different manners in order to carry out these two different functions of collecting data and controlling a mobile radio device 1. It is also basically possible to carry out both functions in parallel.

Both agents, i.e., the internal agent 10 and the external agent 13, are taught in a learning mode. In so doing, the respective agent learns how to efficiently control the data connections and/or data transmissions and how to efficiently collect data. In the learning mode, basic data, which can be used as the basis for the control operations that are carried out, can be made available in the internal memory 11 or the external memory 14. The basic data comprise, for example, geographic positions of radio cells or antenna of transceivers 7, topographical information, control information stored by other internal agents 10 or other external agents 13, etc.

The external agent 13 can basically also be located on the transceiver 7, wherein the external memory 14 is connected to the external agent 13 either directly or via the data network 6 (Internet).

The agent will be explained in the following with reference to FIG. 2.

Figure 2:
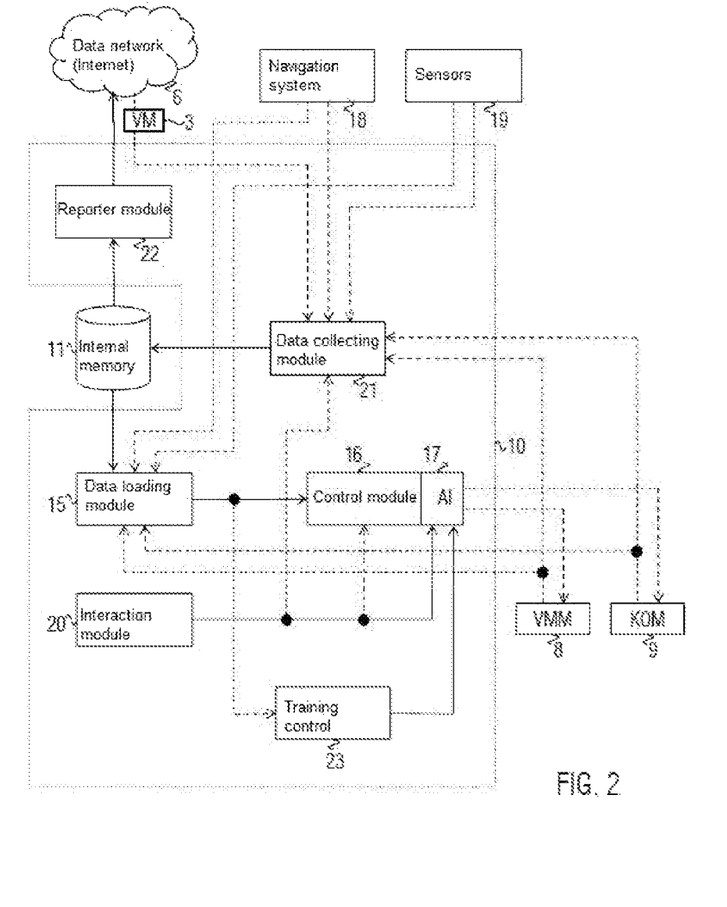
FIG. 2 schematically shows a block diagram of an agent of a mobile radio device having further components of the mobile radio device connected thereto.

FIG. 2 shows the agent using an internal agent 10 as an example. An external agent 13 substantially comprises the same design as the internal agent 10. An internal agent 10 is installed on a mobile radio device 1, while an external agent 13 is installed outside of a mobile radio device 1, in particular on a radio system control server 12.

The solid arrows show the necessary connections between the respective modules and the dashed arrows show the optional connections.

In a basic configuration for operation, the internal agent 10 includes a data loading module 15, a control module 16, and an output interface 17 (AI), which is coupled to the control module 16.

The data loading module 15 is used to select and load control information for controlling a data connection and/or a data transmission via this data connection. The data loading module 15 is connected to the internal memory 11 and to the control module 16.

The control module 16 controls a data connection and/or a data transmission via this data connection, depending on the control information made available by the data loading module 15 at an input of the control module 16, by outputting transmission parameters at the output interface 17. The control module 16 is connected to the data loading module 15 and, via the output interface 17, to the connecting module manager 8 (VMM) and the communication organization module 9 (KOM).

The output interface 17 forwards the transmission parameters generated by the control module 16 to the connecting module manager 8 and the communication organization module 9. The output interface 17 is connected to the connecting module manager 8, the communication organization manager 9, and the control module 16.

The data loading module 15 reads the data records of the control information stored in the internal memory 11 out of the internal memory, as needed, and transmits these to the control module 16.

The control module 16 is designed as a self-learning system. This preferably comprises a neural network, in particular a perceptron. The control module 16 controls the at least one data connection and/or one data transmission with respect to time and/or with respect to transmission parameters via this at least one data connection.

In the operating mode, the control module 16 has already been taught, i.e., to fulfill its control tasks.

The control module 16 receives control information that has been transmitted by the data loading module 15. This control information is an input pattern on the input side of the neural network thereof. In the neural network, an output pattern is generated from the applied input pattern by means of further processing within the network of the artificial neurons, said output pattern being applied on the output side of the neural network. This output pattern is a transmission parameter. That is, the control information that is entered are input patterns and the transmission patterns that are output are output patterns for the neural network, and the neural network sets these in relation to one another.

The transmission parameters are forwarded or output by the control module 16 via the output interface 17 at the connecting module manager 8 and the communication organization module 9, respectively.

By the effect of these transmission parameters, the connecting module manager 8 controls at least one data connection, and the communication organization module 9 controls at least one data transmission via one of the data connections. The control takes place with respect to time and/or with respect to the transmission parameters.

As an option, the data loading module 15 can be designed to carry out a preprocessing of the control information received from the internal memory 11. The preprocessing comprises the gathering of control information, the use of a threshold value, a scaling, and/or a weighting according to frequency and/or relevance. The preprocessing efficiently reduces the complexity of the control information.

In addition to the above-mentioned basic configuration, the internal agent 10 or the above-described components thereof can have additional connections to components of the mobile radio device 1, e.g., to the connection module manager 8 and/or to the communication organization module 9, and to other components, such as, e.g., a navigation system 18 and/or further sensors 19, and/or can comprise one or more optional modules, such as an interaction module 20, a data collecting module 21, a reporter module 22, and a training control 23. These optional connections and modules are explained in the following with reference to FIG. 2.

The data loading module 15 can be connected to the connecting module manager 8 and/or to the communication organization module 9 and can receive therefrom, via transmission, connection parameters and/or data parameters that were measured or determined, i.e., current transmission parameters.

The data loading module 15 can be connected to a navigation system 18 and/or further sensors 19 and can receive therefrom, via transmission, current parameters that were measured or determined. A navigation system 18 can provide, as parameters, a location, a route, a speed, a road course, a road type (highway, interstate, rural road, etc.) and/or particular traffic situations (traffic jam, heavy traffic, accident, construction site, etc.). Further sensors 19 (with the loaded parameters thereof) can be a tachometer (speed), a thermometer (temperature), a rain sensor (precipitation), a calendar (date, day of the week), and a clock (time of day, date, day of the week).

The data loading module 15 can reference the control information from the internal memory 11 with current parameters. Current parameters can also be forwarded directly to the control module 16 as control information.

The interaction module 20 is connected to the control module 16. In an interaction with a user, the transmission parameters are modified accordingly in order to execute the interaction carried out by the user. These modified transmission parameters are fed to the connecting module manager 8 and/or the communication organization module 9 and are applied at the outputs of the control module 16 via the output interface 17. The control module 16 simultaneously receives, from the communication module 20 via the direct connection, the information that the transmission parameters have been overridden at the outputs of the control module 16 by an interaction. As a result, the control module 16 transitions into a learning mode, in which this control module sets the control information present at the inputs in relation to the "overridden" transmission parameters. In other words, when the transmission parameters are overridden, the control module 16 notes the interrelationship between the current control information and the transmission parameters. In so doing, during the operation of the agent, this agent is further trained by the interactions carried out by the user.

The data collecting module 21, which is connected to the internal memory 11, is connected to at least one of the following components: the data network 6 (Internet) via a connecting module 3, the connecting module manager 8, the communication organization module 9, the navigation system 18, a further sensor 19, and the interaction module 20. The data collecting module 21 receives data from the components connected thereto or collects said data and stores the collected data in the internal memory 11. These data primarily comprise transmission parameters that describe the radio channels and the connection capacities thereof. However, these data can also be data that describe the driving-specific data regarding a route, such as, for example, the location coordinates of the route, driving destinations, junctions, the speed, the traffic, or user-specific data regarding a route that describe the behavior of the user with respect to the data connections.

By collecting and storing the data, the data records of the control information stored in the internal memory 11 are newly created, updated, or supplemented. The data collecting module 21 is preferably designed such that said data collecting module statistically evaluates transmission parameters that are linked to location and/or time information, and therefore transmission parameters that are obtained at certain times and/or locations, and driving-specific or user-specific data are stored so as to be geo- or time-referenced. These can be weighted according to their frequency and can be stored accordingly in the internal memory 11. As a result, when a certain route is repeatedly driven, route-specific data are generated, which describe the connection capacities, radio channels, availabilities, etc., on the basis of the transmission parameters and which define the significance of the data by means of a statistical weighting on the basis of the frequency. Therefore, the database for the control information for the control module is continuously improved during operation.

The data collecting module 21 is a statistical system, which results in the agent "learning" route-specific information by means of the increasingly expanding database. A "learning" agent can basically be designed to comprise such a data collecting module 21 and a non-learning control module 16. A self-learning control module 16 is preferred, of course, although this is not absolutely necessary in order to automatically adapt the behavior of the agent to the route-specific conditions.

The database can be expanded by storing the transmission parameters that are linked to location and/or time information without a statistical evaluation, wherein a related statistical evaluation can be carried out by the data loading module 15 during read-out. In so doing, the data volume stored in the internal memory 11 must be limited, e.g., by deleting data of a certain age and above.

By use of the self-learning control module 16, route-specific information is also learned during operation when an interaction takes place and location and/or time information is applied as control information at the input side. Route-specific information can basically also be learned using only the self-learning control module 16, wherein a statistical evaluation of the collected data is not carried out. An expansion of the database with the data collecting module 21 and a corresponding statistical evaluation are preferred, however.

The reporter module 22, which is connected to the data network 6 (Internet) and the internal memory 11, reads data records of the control information out of the internal memory 11 and transmits these via the data network 6 (Internet) to internal agents 10 of other mobile radio devices 1, to internal memories 11 of other mobile radio devices 1, to external agents 13, and/or external memories 14. As a result, other agents 10, 13, in particular, are enabled to carry out their control tasks on the basis of data records of the control information that are updated by the internal agent 10.

The data are preferably anonymized by the data collecting module 21 or the reporter module 22 before said data are transmitted.

The reporter module 22 of an internal agent 10 can transmit the data, which have been statistically preprocessed or not statistically preprocessed, to a data collecting module 21 of an internal agent 13.

The training control 23, which is connected to the output interface 17, is used to teach the control module 16. In the learning mode, the training control 23 performs the control tasks of the internal agent 10 by generating parameters with which a data connection and/or a data transmission over this data connection is carried out so as to be controlled with respect to time and/or with respect to transmission parameters. The training control 23 transmits transmission parameters to the output interface 17, which are forwarded via the output interface 17 to the connecting module manager 8 and the communication organization module 9, and so these, under the effect of these parameters, control the data connection and/or the data transmission via this data connection with respect to time and/or with respect to transmission parameters.

A training control 23 has a logic that is substantially more complex and, therefore, more costly than that of a control module 16. The relatively simpler control module 16 is designed, by means of the learning operation, to efficiently carry out the control operations even without the presence of the training control 23.

The training control 23 includes sensors that substantially more precisely determine the radio-system specific parameters, such as connection parameters, than the sensors that are usually present in a mobile radio device 1. As a result, the control of the data connections or data transmission can be carried out highly precisely and reliably.

In the learning mode, control information is applied at the input side of the control module 16 by the data loading module 15. This control information is an input pattern and the transmission parameters provided by the training control 23 are an output pattern. The neural network of the control module 16 learns the mapping of the input pattern onto the output pattern, and so the neural network autonomously generates output patterns onto corresponding input patterns during normal operation. The more often the control module 16 is taught, the more precise its control behavior becomes. This learning operation therefore takes place repeatedly, and therefore the control module 16 is taught to carry out the control tasks in the manner that the training control 23 carries these out.

Figure 3:
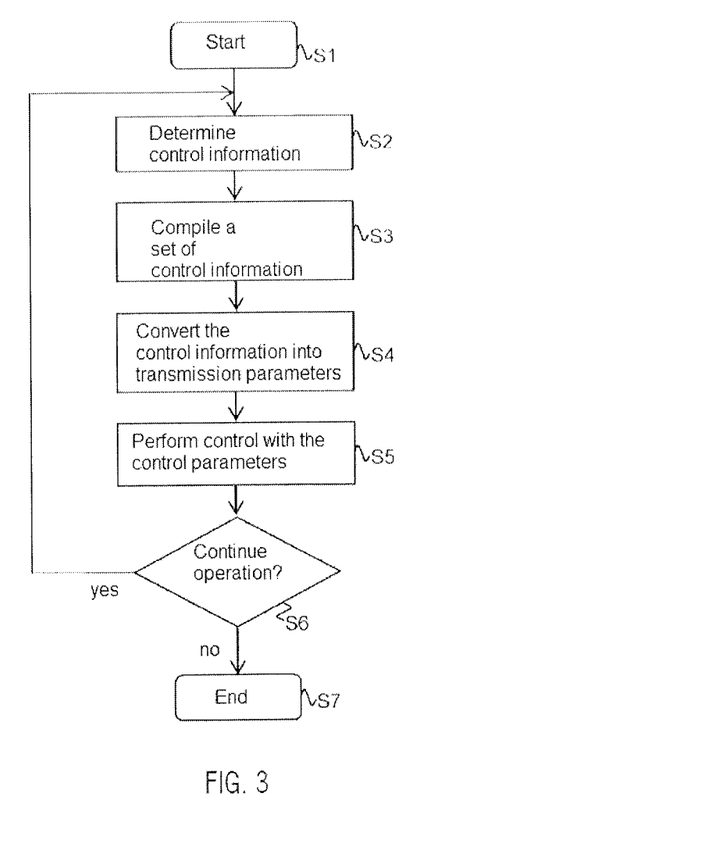
FIG. 3 is a flow chart of a method for controlling data connections and/or data transmissions.

A method for controlling data connections and data transmissions of a mobile radio device 1 is explained in the following (FIG. 3).

The method begins with step S1.

The data loading module 15 determines control information that includes parameters that can influence data connections and/or data transmissions that are formed with the mobile radio device 1 (step S2).

The control information includes current measurement values, such as, for example, the speed, and/or historical parameters, which were stored in the past, such as transmission parameters, time information, location information, and user information. Transmission parameters comprise connection parameters and data parameters. The time information is, for example, time of day, date, and day of the week. Location information can comprise location coordinates, maps, geodata, locations of transmission towers and/or topographical information. User information is, for example, age, gender, behavior information, such as, for example, preferred hobbies or Internet sites that are preferably called up by the user, or Internet actions carried out by the user at a certain point in time. The data loading module 15 reads the corresponding control information out of the internal memory 11 and/or out of further sources, in particular out of a navigation system 18 and sensors 19.

The data loading module 15 compiles a set of parameters of control information from the control information that is determined (step S3). This parameter set forms an input pattern for the data control module 16. The data loading module 15 compiles the same set of parameters of control information for a certain control module 16 in each case. The values of the individual parameters can be different, of course. This compilation includes making a selection from the previously ascertained control information.

The control module 16 converts the control information into transition parameters (step S4). Since the control module 16 is designed as a neural network, the input pattern consisting of the parameters of the control information are mapped onto an output pattern that contains the transmission parameters.

The transmission parameters are applied at the output interface 17 (step S5). The output interface 17 is connected to the connecting module manager 8 and the communication organization manager 9. The connection module manager 8 controls at least one connecting module 3, which controls a radio channel. The communication organization module 9 controls the logical data connections. By transmitting the transmission parameters to the connection module manager 8 and the communication organization module 9, the data connections and data transmission are controlled with respect to the physical parameters (e.g., frequency, data rate, etc.) and with respect to the logical parameters (e.g., calling up certain data via a certain link).

Next, a check is carried out to determine whether to continue the operation (step S6). If this is the case, the sequence returns to step S2, in which a further set of control information for the control module is determined and made available. Otherwise, the sequence transitions to step S7, with which the operation is terminated.

In step S3, the data loading module 15 can carry out, in addition to a selection, an optional preprocessing of the control information, wherein this preprocessing comprises calculating, combining, and/or linking control information.

During this operation, the data collecting module 21 acquires data every time the transmission parameters, in particular the connection parameters, change, and/or at predetermined intervals of time or distance.

When the control module 16 is taught to control data connections and data transmissions of a mobile radio device 1, substantially the same operation as described above is carried out, although the transmission parameters are specified by the training control 23 and are learned accordingly by the neural network of the control module 16.

It is advantageous, in such a teaching operation, to bring the control module 16 into various learning situations, e.g., by moving the mobile radio device 1 to as many different locations as possible or by applying the correspondingly different parameters at the neural network as a simulation.

After the teaching is terminated, the training control 23 is removed from the mobile radio device 1.

Beyond the teaching with the training control 23, the control module 16 can be further taught during operation, wherein user interactions are taken into account in particular. The interaction module 20 receives the interactions, determines transmission parameters therefrom, and forwards these via the output interface 17 to the connecting module manager 8 and/or the communication organization module 9, in order to control these components.

The control module 16 reads these transmission parameters, which have been modified by interactions, from the output interface and internally sets up its neural network such that the applied control information is mapped onto the modified transmission parameters. As a result, the control module 16 learns to control the data connections or data transmissions according to the interaction.

Various embodiments will be explained in the following, in which data connections and/or data transmissions are controlled by means of an agent.

In a first embodiment, the control information that is applied at the input side of the control module 16 is the current location, the current time, the current date, and historical transmission parameters that describe the radio channels and their connection capacities.

The data loading module 16 receives the current location coordinates from the navigation system 18 (step S2). According to these location coordinates, the current day of the week, and the current time, the data loading module reads the control information linked to location and time information out of the internal memory 11. This control information is applied, together with the location and time information from the data loading module 15, at the input side of the control module 16 (step S3).

The control module 16 receives this set of control information as an input pattern and converts the set of control information into an output pattern according to its behavior that was taught in the learning operation (step S4). The transmission parameters contain the information regarding which radio channel and/or which frequency to switch to. The switch is preferably made to the most efficient and/or most cost-effective radio channel, i.e., to the radio channel having the highest data rate and/or the lowest costs.

By means of the output transmission parameters, the control module 16 controls the connecting module manager 8 via the output interface 17 such that the connecting module manager switches to the radio channel determined by the control module 16 (step S5).

In this first embodiment, the control module 16 determines, on the basis of the current position of the mobile radio device 1, the radio channel that is probably (statistically most likely) the most efficient for this position, or determines the frequency thereof, and controls the connecting module manager 8 such that this radio channel is switched to. Given that the data collecting module 21 continuously collects transmission parameters, the control information becomes more precise and reliable when certain routes are repeatedly traveled, and therefore the switch to certain radio channels becomes increasingly more precise and reliable. In addition, when interactions occur between the user and the agent, the corresponding behavior by the user can be learned and can be taken into account in the switch. For example, the control module 16 of the agent can learn that the user calls up certain data sources, e.g., certain on-line newspapers, on workdays at certain times and at certain locations. If a user uses the mobile radio device 1 in order to read a certain on-line newspaper while commuting from or to his workplace, there is usually a coincidence between the locations along the driving route, the times of day, and the data source on workdays. These coincidences are detected by the control module 16 and then a radio channel that is optimized in terms of transmission capacity and costs is set up for this purpose.

In a second embodiment, the control information that is applied at the input side of the control module 16 is the current location, the current time, the current date, and historical transmission parameters that describe the radio channels and their connection capacities, as well as historical location information that indicate the locations of the transceivers 7.

The data loading module 15 receives, from the navigation system 18, the current location coordinates and determines, on the basis of the current location, the position of transceivers 7 in a range about the location (step S2). The range is up to 50 km, typically 1 km, 2 km, 3 km, 4 km, 5 km or 10 km, around the location. The size of the range is typically determined on the basis of the mean radio cell size of one or more of the radio systems used. According to this range size, the current day of the week, and the current time, the data loading module 15 reads the control information linked to location and time information out of the internal memory 11. These are applied, together with the location and time location, at the input side of the control module 16 (step S3) and are converted thereby into transmission parameters (step S4), in order to activate the connecting module manager 8 such that said connecting module manager switches to the radio channel determined by the control module 16 (step S5).

In this second embodiment, the control module 16 also accounts for the current distance of the mobile radio device 1 from the closest transceiver 7 when determining the most efficient radio channel or the frequency thereof. For the rest, the second embodiment corresponds to the first embodiment. This embodiment shows that different data that influence the connection capacity can be taken into account (also jointly) by the use of a neural network and the connecting module manager 8 is controlled such that this radio channel is switched to.

In a third embodiment, information related to the data connections or data transmissions is used depending on the direction of movement and the speed of movement of the mobile radio device 1 in order to make a prediction as to which radio channels to switch to and in order to adapt the behavior of the applications of the mobile radio device 1 to changing connection capacities.

The data loading module 15 receives the current location coordinates, the direction of movement, and the speed of movement of the mobile radio device 1 from the navigation system 18 (step S2). According to this information that is received, the data loading module 15 reads control information out of the internal memory 11, which was previously determined and which describes radio channels and their connection capacities depending on the current location, the direction, and the speed. Since the mobile radio device is usually moved along certain traffic routes, such as roads or rail lines, data are stored in the internal memory that describe the connection capacities at locations along the traffic routes. Therefore, this is route-specific information. When the direction of movement and the speed of movement are taken into account, data that the connection capacities at locations along traffic routes therefore read out. These are applied, together with further data, such as, e.g., the information received from the navigation system 18, by the data loading module 15 at the input side of the control module 16 (step S3) and are converted thereby into transmission parameters (step S4). When the radio channel is changed, a switch is made to the most efficient radio channel located in the direction of movement, i.e., the radio channel having the highest data rate and/or the lowest costs. The control module 16 can evaluate the significance of the historical data with reference to the speed of movement and the direction of movement. If the vehicle moves, e.g., at a high rate of speed, in a certain direction, then it does not make much sense to switch to a radio channel that is available only for a short stretch and, therefore, only for a short period of time when the speed is high, although, if the speed is slower, it can indeed make sense to switch, e.g., to a free W-Lan, which has a high connection capacity and is free of charge, and which is accessible only in a small local region.

In this third embodiment, the control module 16 determines the radio channel that is the most efficient for a location of the mobile radio device 1 that will be reached soon (anticipation) on the basis of the current location, the direction of movement, and the speed of movement of the mobile radio device 1, and on the basis of the read-out data regarding radio channels or radio frequencies and the connection capacities thereof. Furthermore, the control module 16 controls the applications of the mobile radio device 1 such that these have adjusted their utilized connection capacity accordingly upon arrival, at the latest, in a region having a changed connection capacity.

Occasionally, a user would like to regularly read certain data, such as, e.g., information from a certain online newspaper at a certain point in time. The corresponding data should therefore be available at the mobile radio device 1 at the particular point in time. It may be possible that the mobile radio device 1 is located in a radio network at an earlier point in time, by means of which said radio network the data can be downloaded more cost-effectively and/or faster than at the actual time of use.

In a fourth embodiment, such a situation is used in order to transmit data at a loading time before the point in time at which said data are used, as cost-effectively and/or rapidly as possible, i.e., at a high data rate (prefetching). The point in time at which the data are used is the point in time at which the user uses the data by means of an application, i.e., the point in time at which the data are read in or called up by a certain application. The loading point in time is ahead of the point in time of use and is the point in time at which the data are downloaded from the data network 6 (Internet).

In order for such a complex situation to be correctly detected and utilized, the following control information is applied at the input side of the control module 16: Radio channel IDs and/or radio frequencies of available radio channels, transmission costs of the radio channels, time of day, date or type of weekday (workday, weekend, holiday).

This control information is converted into the following control parameters: Radio channel ID and/or radio frequency, radio channel to which to switch, reference or link to the data in the data network 6 (Internet), control signal for using an application.

In contrast to the previous embodiments, the control module 16 must be taught in a plurality of steps in this case, because the control module 16 must first learn, in a first learning step, to automatically download and store certain data at certain points in time, wherein a radio channel that is as cost-effective and/or fast as possible or a radio frequency that is cost-effective and/or fast should be used in this case. By storing the data, the loading is independent of the execution of the corresponding application that uses the data. The loading point in time can therefore be freely selected on the basis of the control information.

In a second learning step, the control module 16 is trained to distinguish between the loading point in time and the point in time of use by calling up and utilizing the stored data with the respective application independently of the loading operation. These learning steps take place in the learning mode.

If this is successfully taught to the control module 16, then new data sources and points in time of use can be determined in the operating mode via interactions with the user, in that the user repeatedly calls up certain data sources at certain points in time and on certain days. The user behavior is anticipated by means of this prefetching.

In this fourth embodiment, the control module 16 learns to transmit data before the point in time when they are used, at a loading point in time as cost-effectively and/or rapidly as possible, i.e., at a high data rate (prefetching). In so doing, the control module 16 is taught, in a plurality of steps in a learning operation, to determine the most favorable and/or fastest radio channel, on the basis of radio channel IDs and/or radio frequencies of available radio channels and on the basis of the transmission costs of the radio channels, and to download—via the selected radio channel—and make available the data that are likely desired by the user, before actual use, on the basis of the time of day and the date or the type of weekday (workday, weekend, holiday).

The above-described examples, in which a data connection and/or data transmission are/is controlled by means of an internal agent 10, can also be carried out using an external agent 13. In so doing, the external agent 13 transmits either commands or instructions and/or data to an internal agent 10, which converts them accordingly, or the external agent 13 transmits, via the radio connection, transmission parameters, commands or instructions to the connecting module manager 8 and/or to the communication organization module 9, which are converted directly thereby.

In a radio system according to the invention having a plurality of mobile radio devices 1, different combinations of internal agents 10 and/or external agents 13 can be provided, wherein a plurality of internal agents 10 and/or external agents 13 can also communicate with one another in each case. The advantages of using one or more external agents 13 are an extensive database, since an external agent 13 can collect control information from a plurality of internal agents 10 or the respective mobile radio devices 1 and make these data available to the respective internal agent 10. The external agent 13 prepares the information from the different mobile radio devices 1 and from the agents 10, 13 communicating therewith, wherein said external agent collects and links certain connection parameters, such as, e.g., data rate, frequencies, and/or radio channel IDs with location information and/or time information.

Since an external agent 13 has access to the communication states of a plurality of mobile radio devices 1, it makes sense for said external agent to also transmit instructions or commands to the mobile radio device with which the operation of the individual applications executed on the mobile radio devices 1 is controlled. It is hereby possible to match the data connections of the individual applications— and of different mobile radio devices—to one another, e.g., with respect to connection capacity, etc. These commands are forwarded by the communication organization module 9 to the respective applications.

In the event, e.g., of special situations, such as, e.g., a traffic jam, in which a very large number of mobile radio devices 1 accesses the radio connections of a radio cell, an external agent can control the radio capacities of the individual radio devices such that the radio network does not collapse and a minimum radio capacity is available to all participants such that important radio connections are ensured, e.g., for an emergency call.

The external agent 13 can also control an internal agent 10. In this case, the external agent 13 generates control information, which is applied at the inputs of the control module 16 of the internal agent 13. This control information comprises, e.g., data that describe the use of the radio channels by further mobile radio devices, or preferred settings, which are implemented accordingly by the internal agent, is possible. These preferred settings have an effect similar to that of the above-described commands or instructions, which are transmitted by the external agent directly to the respective communication organization modules 9 and/or connection module manager 8.

The control information that is generated by the external agent is taken into account, together with the internal control information from the internal agent 10, and is weighted according to the learned behavior. It is expedient that the control information from the external agent has a higher priority, since said external agent has a larger database. In special cases, it can also be expedient, however, to assign a higher priority to the internal control information.

An internal agent that accounts for the speed at which a mobile radio device moves, said mobile radio device being installed, e.g., in a motor vehicle, can immediately detect a traffic jam when the speed is reduced below a predetermined threshold value of, e.g., 10 km/h, in combination with the geodata that the motor vehicle is located on an interstate or highway. Such a detection of a traffic jam takes place in the internal agent more quickly than in the external agent and is suitable, in particular, for detecting a developing traffic jam if an accident has just occurred. In such a situation, the internal agent can switch to a mode in which the need for connection capacity is reduced, even if the control information provided by the external agent still offers a large connection capacity. The internal agent can inform the external agent accordingly. In such a situation, the priorities of the internal control information are higher than those of the external control information. This prioritization is carried out in the neural network by the control module 16.

The above-described embodiments show that an agent according to the invention can be used in highly diverse manners. By using such an agent, it is possible to account for a plurality of different parameters simultaneously as control information on the input side. The agents can be adapted to highly diverse requirements by means of the selection of the control information and the transmission parameters and the corresponding learning methods. The agents also make it possible to collect route-specific connection properties and, when corresponding routes are used, to control data connections and/or data transmissions with respect to the transmission parameters and/or the time. The route-specific connection properties can be collected within a mobile radio device and can be used thereby. At the same time, it is also possible to collect these route-specific data using one or more external agents, each of which is connected to a plurality of mobile radio devices. The external agents then provide the collected connection information to the respective mobile radio devices or use this to directly control the mobile radio devices.

The collected data are statistically analyzed. The collected data can be statistically analyzed, wherein this can take place during storage and/or during read-out, and/or in a self-learning system, such as, for example, a neural network, by continuously learning the interactions of the user statistically analyzed, in that the neural network statistically links the transmission parameters generated by means of the interactions to the current control information applied at the input side of the neural network. The larger the number and the greater diversity of the parameters of the control information, the more complex the situations are that the neural network can learn.

An external agent can be used to combine data from different mobile radio devices. In place of an external agent, it is also possible for internal agents to communicate directly with one another. This is possible with mobile radio devices, for example, that are provided in motor vehicles that have so-called car2car communication, by which motor vehicles can communicate directly with one another in the near field. Such a motor vehicle can therefore receive very current information regarding connection capacities, etc., from vehicles in oncoming traffic.

LIST OF REFERENCE NUMBERS 1 mobile radio device
2 central communication unit
3 connecting module
4 antenna
5 external communication partner
6 data network (Internet)
7 transceiver
8 connecting module
9 communication organizing module
10 internal agent
11 internal memory
12 radio system control server
13 external agent
14 external memory
15 data loading module
16 control module
17 output interface
18 navigation system
19 other sensors
20 interaction module
21 data collecting module
22 reporter module
23 training control The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a mobile radio device to which one or more agents are operatively coupled, wherein the method comprises the acts of:
acquiring route-specific information and/or user-specific information, by way of the one or more agents operatively coupled to the mobile radio device, and
using the acquired route-specific information and/or user-specific information to:
(a) control an existing data connection based on time and transmission parameters such that the mobile radio device efficiently uses the existing data connection for a data transmission, and/or
(b) control the data transmission based on time and transmission parameters such that the mobile radio device efficiently uses the existing data connection for the data transmission,
wherein the transmission parameters describe properties of the at least one of: the existing data connection, the data transmission, and the data transmitted; and
wherein the transmission parameters further comprise one or more of:
connection parameters that describe a radio channel; and
data parameters that describe a data transmission via the existing data connection or data assigned to the data transmission.

2. The method according to claim 1, wherein the at least one agent comprises a self-learning system, which system learns the route- and/or user-specific information during operation of the mobile radio device.

3. The method according to claim 2, wherein the self-learning system comprises a neural network, which maps control information present at an input side thereof onto the transmission parameters, which control the existing data connection and/or the data transmission.

4. The method according to claim 3, wherein the control information comprises one or more of:
transmission parameters,
time information,
location information
movement-specific information, and
user information.

5. The method according to claim 4, wherein:
the transmission parameters comprise connection parameters and data parameters,
the time information comprises one or more of a time of day, date, day of week, type of weekday,
the location information comprises one or more of location coordinates, map data, geodata, locations of transmission towers, topographical information, route coordinates, and
the user information describes one or more of: age, gender, user behavior information with respect to use of the existing data connection and/or data transmission over the existing data connection.

6. The method according to claim 2, wherein the at least one agent comprises a data collecting module, which collects the route- and/or user-specific information during operation of the mobile radio device and stores the information in a memory as control information.

7. The method according to claim 1, wherein the at least one agent comprises a data collecting module, which collects the route- and/or user-specific information during operation of the mobile radio device and stores the information in a memory as control information.

8. The method according to claim 7, wherein the control information is stored so as to be linked to location and/or time information.

9. The method according to claim 8, wherein the control information is statistically analyzed during storage and/or during read-out from the memory and is weighted according to a frequency thereof.

10. The method according to claim 7, wherein the control information is statistically analyzed during storage and/or during read-out from the memory and is weighted according to a frequency thereof.

11. The method according to claim 1, wherein:
the connection parameters comprise one or more of: the radio channel identification, frequency, data rate, latency, error rate, capacity utilization, radio cell, time slot, availability, quality-of-service parameters, and/or costs of the radio system or the radio channels; and
the data parameters comprise one or more of: data quantity, storage location, link or reference to the data, type of data, resolution of image or video data, the codec that is used, minimum data rate required for transmission, quality-of-experience parameters, and/or costs of the data transmission or the data.

12. The method according to claim 1, wherein one agent communicates with other agents, which are installed on different mobile radio devices or communicate therewith, and receives data, which have been anonymized and stores this data as control information.

13. The method according to claim 12, wherein the perceived data that has been anonymized is received from other agents.

14. The method according to claim 1, wherein one agent is an external agent, which is installed outside of the mobile radio device and on a radio system control server.

15. The method according to claim 14, wherein the external agent controls a plurality of mobile radio devices via transmission of commands, or the external agent controls a plurality of mobile radio devices, each of which comprises at least one internal agent.

16. The method according to claim 1, wherein the existing data connection and/or the data transmission is controlled with respect to time and/or with respect to transmission parameters such that costs generated by the data transmission are low, a connection capacity of the existing data connection is great, and/or a predetermined user behavior is anticipated.

17. A mobile radio device, comprising:
at least one connecting module configured to establish an existing wireless data connection between the mobile radio device and at least one transceiver located outside of the mobile radio device; and
a controller configured to control the existing wireless data connection and/or a data transmission, via the at least one existing wireless data connection, by:
  acquiring route-specific information and/or user-specific information, by way of one or more agents that are coupled to the mobile radio device, and
  using the acquired route-specific information and/or user-specific information to:
    (a) control the existing wireless data connection based on time and transmission parameters such that the mobile radio device efficiently uses the existing wireless data connection for the data transmission, and/or
    (b) control the data transmission based on time and transmission parameters such that the mobile radio device efficiently uses the existing wireless data connection for the data transmission,
  wherein the transmission parameters describe properties of the at least one of: the existing wireless data connection, the data transmission, and the data transmitted.

18. The mobile radio device according to claim 17, further comprising:
a data collecting module for collecting control information;
an internal memory for storing the control information;
a data loading module for reading out certain control information from the internal memory;
a control module, which is designed to convert the control information already provided by the data loading module into transmission parameters, wherein the control module is designed as a self-learning system; and
a connecting module manager for controlling the existing wireless data connection between the mobile radio device and external transceivers and/or a communication organizing module for controlling the data transmission.

19. A radio system comprising:
at least one transceiver; and
at least one mobile radio device, wherein the at least one transceiver and the at least one mobile radio device communicate with one another via at least one existing data connection through at least one data transmission, wherein the at least one mobile radio device comprises:
  at least one connecting module for establishing the at least one existing data connection between the mobile radio device and the at least one transceiver, which is located outside of the mobile radio device, and
wherein:
the mobile radio device is controlled such that the at least one existing data connection and/or the at least one data transmission is controlled via the at least one existing data connection between the mobile radio device and the at least one transceiver, by:
  acquiring route-specific information and/or user-specific information, by way of one or more agents that are coupled to the mobile radio device, and
  using the acquired route-specific information and/or user-specific information to:
    (a) control the at least one existing data connection based on time and transmission parameters such that the mobile radio device efficiently uses the at least one existing data connection for the at least one data transmission, and/or
    (b) control the at least one data transmission based on time and transmission parameters such that the mobile radio device efficiently uses the at least one existing data connection for the at least one data transmission,
  wherein the transmission parameters describe properties of the at least one of: the at least one existing data connection, the at least one data transmission, and the data transmitted.

20. The mobile radio device according to claim 19, further comprising:
a data collecting module for collecting control information;
an internal memory for storing the control information;
a data loading module for reading out certain control information from the internal memory;
a control module, which is designed to convert the control information already provided by the data loading module into transmission parameters, wherein the control module is designed as a self-learning system; and
a connecting module manager for controlling the at least one existing data connection between the mobile radio device and external transceivers and/or a communication organizing module for controlling the data transmission.

* * * * *